Patented Dec. 3, 1940

2,224,112

UNITED STATES PATENT OFFICE 2,224,112

WATER-SOLUBLE DYESTUFFS

Hans Krzikalla and Heinrich Wenning, Ludwigshafen-on-the-Rhine, Germany, assignors to General Aniline & Film Corporation, a corporation of Delaware No Drawing. Application June 30, 1939, Serial No. 282,216. In Germany July 8, 1938

13 Claims. (Cl. 260—156)

The present invention relates to water-soluble dyestuffs and a process of producing same.

We have found that water-soluble dyestuffs are obtained by causing organic dyestuffs which contain at least one aliphatically-combined hydroxy group to react with formaldehyde or its polymers, mineral acids or their anhydrides and tertiary organic nitrogen bases.

The reaction is preferably carried out by first causing to act on the dyestuff, which if desired may be dissolved or suspended in a solvent not impairing the reaction, as for example methylene chloride, carbon tetrachloride or tetrahydrofurane, at least an equivalent amount of formaldehyde or the more easily handled paraformaldehyde in the presence of at least an equivalent amount of an anhydrous mineral acid. It is preferable to use anhydrous hydrogen chloride which is led through the solution or suspension containing the dyestuff and paraformaldehyde. To the reaction mixture, from which the unconverted hydrogen chloride has already been removed, there is then added at least an equivalent amount of a tertiary nitrogen base. As such there may be mentioned for example aliphatic tertiary amines, such as triethylamine or triethanolamine, tetramethyl ethylene diamine, or tertiary heterocyclic nitrogen bases, such as pyridine and its homologues, N-methylpiperidine or N-alkylpyrrolidines.

In the first stage the hydroxyl group of the dyestuff is probably converted, by one molecule of formaldehyde and one molecule of the acid, for example hydrogen chloride, into a chlormethoxy group which then reacts in the second stage with the tertiary nitrogen base to form a quaternary ammonium group.

The two stages may also be combined, for example by leading hydrogen chloride into a mixture of the dyestuff with paraformaldehyde and tertiary base until the desired compound is formed. The tertiary base may itself serve as the solvent in this case.

The reaction usually proceeds most smoothly at ordinary or moderately elevated temperature, as for example 40° to 50° C.; in many cases it is even preferable to cool somewhat, i. e. to from about 0° to 10° C. The quaternary ammonium salts formed are split up by aqueous acids and bases, so that the reaction should not be carried out in the presence of considerable amounts of water.

Members of various classes of dyestuffs may serve as initial dyestuffs, as for example azo dyestuffs, anthraquinone dyestuffs, carbenium and azenium dyestuffs and their leuco compounds, such as triphenylmethane dyestuffs, rhodamines, azines, oxazines, thiazines or nitro dyestuffs. The aliphatic hydroxy groups may be contained in these dyestuffs in the form of a hydroxyalkyl group, as for example hydroxymethyl, hydroxyethyl, dihydroxypropyl or hydroxyalkyl ether groups. These groups may be attached to an aromatic nucleus of the dyestuff molecule either directly or by means of a bridge, as for example an oxygen or sulphur atom or an —NH—, —NR—(R representing an organic radicle), —CO—, —SO$_2$—, —OCO—, —NHCO— or NHSO$_2$— bridge. Furthermore the hydroxy group may be present in the form of a carboxylic acid group; suitable dyestuffs of this kind are those in which this group is attached directly to an aryl nucleus or with which an alkylcarboxylic acid group is connected either directly or by means of one of the said bridges.

The initial dyestuffs may also contain more than one hydroxy group, and also any other substituents, as for example halogen atoms, alkoxy, acetoxy, alkyl, nitro, acylamino and alkyl-sulphonic groups or also tertiary amino groups.

The water-soluble dyestuffs thus obtained may serve for dyeing a great variety of materials, in particular for dyeing and printing animal fibers, such as wool, leather or silk, or vegetable fibers, such as cotton, linen, viscose artificial silk or copper ammonium artificial silk, and also for dyeing and printing cellulose esters and ethers and of mixtures of the said kinds of fibers. Generally speaking the character of the dyestuff is not considerably altered by the introduction of the quaternary ammonium salt groups, only the solubility being increased. From a dyestuff which is insoluble in water, but which can be produced on cotton or viscose artificial silk by a development process, there can be prepared according to this invention a soluble substantive dyestuff. From water-insoluble acetate artificial silk dyestuffs, as for example hydroxyalkylaminoanthraquinones, or azo dyestuffs containing hydroxyethyl groups but not any sulphonic acid groups, water-soluble dyestuffs may be obtained with which acetate artificial silk can be dyed from aqueous baths. Since the water-soluble dyestuffs can be reconverted into the initial dyestuffs, for example by treatment with aqueous alkalies or acids or also salts, as for example sodium acetate or sodium carbonate, they may be used with advantage for the preparation of dyeings fast to washing. They are also eminently suitable for printing fabrics of all kinds.

The following examples will further illustrate how the said invention may be carried out in practice but the invention is not restricted to these examples. The parts are by weight.

Example 1

A current of dry hydrogen chloride or sulphur dioxide is led slowly while stirrring into a mixture of 10 parts of the azo dyestuff obtainable by coupling diazotized 2.4-dinitro-1-aminobenzene with N-dihydroxyethyl-1-amino-3-methylbenzene, 6 parts of paraformaldehyde and 100 parts of pyridine. As soon as a sample of the reaction mixture dissolves clearly in water when heated the reaction is completed. The mixture is poured on to ice and the deposited dyestuff is filtered off by suction and dried under reduced pressure at from 40° to 50° C. It dissolves readily in moderately warm water. Acetate artificial silk may be dyed therewith from a neutral aqueous bath, red shades being obtained. The dyeings are the same as the dyeings obtained with the initial dyestuff.

Example 2

10 parts of the dyestuff obtained by coupling diazotized 1-amino-2-dihydroxypropyloxybenzene with 2-hydroxynaphthalene-3-carboxylic acid-3'-4'-dimethoxy-5'-chlorphenylamide and 2 parts of paraformaldehyde are dissolved in 200 parts of methylene chloride. Into the solution, cooled to 5° C., dry hydrogen chloride is led until the saturation point, the mixture then being allowed to warm up to room temperature. After allowing to stand for a short time, a part of the methylene chloride is evaporated off, the excess of hydrogen chloride being expelled at the same time. A solution of 3 parts of pyridine in 50 parts of methylene chloride is then slowly added to the residual solution of the chlormetryl ether compound. After reaction at 40° C., the whole is evaporated to dryness, the dyestuff being obtained as a powder which is readily soluble in water. It dyes silk red shades of very good fastness to water from a neutral bath.

The reaction may also be carried out under the same conditions with the following azo dyestuffs:

| Diazotized and coupled | Shade of color |
|---|---|
| 1-amino-3-hydroxyethoxy-4-methylbenzene⟶ 2-hydroxynaphthalene | Red. |
| 1-amino-3-hydroxyethoxy-4-methylbenzene⟶ 2-hydroxynaphthalene-3-carboxylic acid phenylamide | Do. |
| 1-amino-3-hydroxyethoxy-4-methylbenzene⟶ 1-phenyl-3-methyl-5-pyrazolone | Yellow. |

The dyestuffs are readily soluble in water and may be brought again into the insoluble form by treatment with acids or alkalies.

The water-soluble dyestuffs may also serve for dyeing cotton.

Example 3

10 parts of the azo dyestuff obtained by coupling diazotized 2-nitro-4-chlor-1-aminobenzene with 2-hydroxy-naphthalene-3-carboxylic acid-2'-dihydroxypropyloxyphenylamide and 2 parts of paraformaldehyde are dissolved in 200 parts of methylene chloride and the solution is saturated with anhydrous hydrogen chloride at from 0° to 5° C. The solution is then kept at from 25° to 30° C. for ¾ hour, undissolved dyestuff then being filtered off and the excess of hydrogen chloride expelled by evaporating a part of the methylene chloride. To the residual solution of the chlormethyl ether compound in methylene chloride there are added at 30° C. 2.5 parts of pyridine, the whole then being heated for a short time at 40° C. and the methylene chloride evaporated off. The residual dyestuff dissolves very readily in water and is suitable for printing cotton, red prints being obtained.

Example 4

A current of dry hydrogen chloride is led slowly while stirring at ordinary temperature into a mixture of 20 parts of 1.4-di-hydroxyethyl-amine-anthraquinone and 10 parts of paraformaldehyde and 350 parts of N-ethylpyrrolidine. When a sample of the mixture dissolves in water, the whole is poured into ice water, the deposited dyestuff filtered off by suction and dried at from 40° to 50° C. under reduced pressure. It dissolves readily in water and may be used for dyeing acetate artificial silk from an aqueous bath. By adding aqueous acids or alkalies, the initial dyestuff is re-formed. It dyes pure blue shades.

Example 5

Dry hydrogen chloride is led through a solution of 25 parts of 4-hydroxy-3-carboxy-5-methyl-4.'4''-tetramethyldiaminotriphenylmethane and 6 parts of paraformaldehyde in 75 parts of pyridine until a sample dissolves in water. Excess hydrogen chloride or unconverted pyridine are then evaporated off under reduced pressure. The leuco dyestuff obtained is readily soluble in water. It goes on to wool and may be converted by after-chroming on the fiber into a violet triphenylcarbenium dyestuff.

Example 6

10 parts of 2.4-dinitro-4'-hydroxyethyldiphenylamine are dissolved in 200 parts of methylene chloride and hydrogen chloride led in at 5° C. until saturated. The mixture is allowed to stand at room temperature for an hour, the excess of hydrogen chloride removed by distillation and 2.5 parts of pyridine added. After the reaction, the solvent is removed. A dyestuff is thus obtained which is readily soluble in water and which dyes silk yellow shades.

What we claim is:

1. A process of producing water-soluble organic dyestuffs which comprises reacting organic dyestuffs having at least one hydroxyl group selected from the class consisting of aliphatically combined hydroxyl groups and carboxyl hydroxyl groups with formaldehyde, a tertiary nitrogen base and a mineral acid.

2. A process of producing water-soluble organic dyestuffs which comprises reacting organic dyestuffs having at least one hydroxyl group selected from the class consisting of aliphatically combined hydroxyl groups and carboxyl hydroxyl groups with formaldehyde, a tertiary nitgrogen base and a hydrohalogen acid.

3. A process of producing water-soluble organic dyestuffs which comprises reacting organic dyestuffs having at least one hydroxyl group selected from the class consisting of aliphatically combined hydroxyl groups and carboxyl hydroxyl groups with formaldehyde, a tertiary nitrogen base and hydrochloric acid.

4. A process of producing water-soluble organic dyestuffs which comprises reacting organic dyestuffs having at least one hydroxyl group selected from the class consisting of aliphatically combined hydroxyl groups and carboxyl hydroxyl groups with formaldehyde, a cyclic tertiary nitrogen base and hydrochloric acid.

5. A process of producing water-soluble organic dyestuffs which comprises reacting organic dyestuffs having at least one hydroxyl group selected from the class consisting of aliphatically combined hydroxy groups and carboxyl hydroxyl groups with formaldehyde, pyridine and hydrochloric acid.

6. A water-soluble organic dyestuff corresponding to the general formula

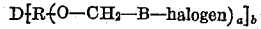

wherein D stands for the radical of an organic dyestuff, R for a radical selected from the class consisting of a divalent aliphatic radical and the carbonyl radical, B for a cyclic tertiary nitrogen base and $a$ and $b$ for integers up to two, the $CH_2$ group shown and the halogen shown being bound to nitrogen contained in the said radical B.

7. A water-soluble organic dyestuff corresponding to the general formula

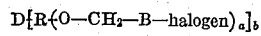

wherein D stands for the radical of an organic dyestuff, R for a divalent aliphatic radical, B for a cyclic tertiary nitrogen base and $a$ and $b$ for integers up to two, the $CH_2$ group shown and the halogen shown being bound to nitrogen contained in the said radical B.

8. A water-soluble organic dyestuff corresponding to the general formula

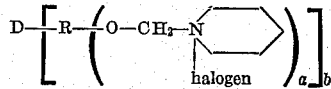

wherein D stands for the radical of an organic dyestuff, R for a divalent aliphatic radical and $a$ and $b$ for integers up to two.

9. A water-soluble organic dyestuff corresponding to the general formula

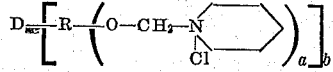

wherein D stands for the radical of an organic dyestuff, R for a divalent aliphatic radical, and $a$ and $b$ for integers up to two.

10. A water-soluble organic dyestuff corresponding to the general formula

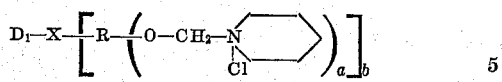

wherein $D_1$ stands for the radical of an organic dyestuff, X for a member of the class consisting of $-N=$, $$-\overset{H}{\underset{|}{N}}-$$

and $-O-$, R for a divalent aliphatic radical having from 2 to 3 carbon atoms and $a$ and $b$ for integers up to two.

11. The dyestuff of the formula

which is soluble in water and dyes animal fibers yellow shades.

12. The dyestuff of the formula

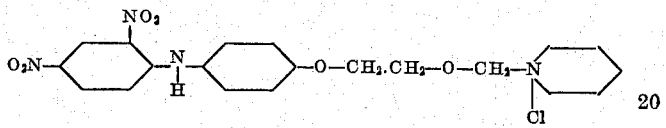

which is readily soluble in water and dyes acetate artificial silk red shades.

13. The dyestuff of the formula

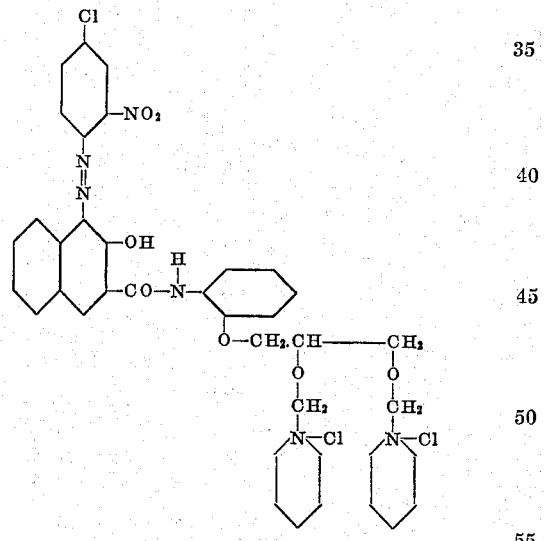

which is readily soluble in water and dyes and prints vegetable fibers red shades.

HANS KRZIKALLA.
HEINRICH WENNING.